D. LAMBERT.
APPARATUS FOR ADMINISTERING ANESTHETICS.
APPLICATION FILED JUNE 10, 1915.
1,222,421.
Patented Apr. 10, 1917.
2 SHEETS—SHEET 2.
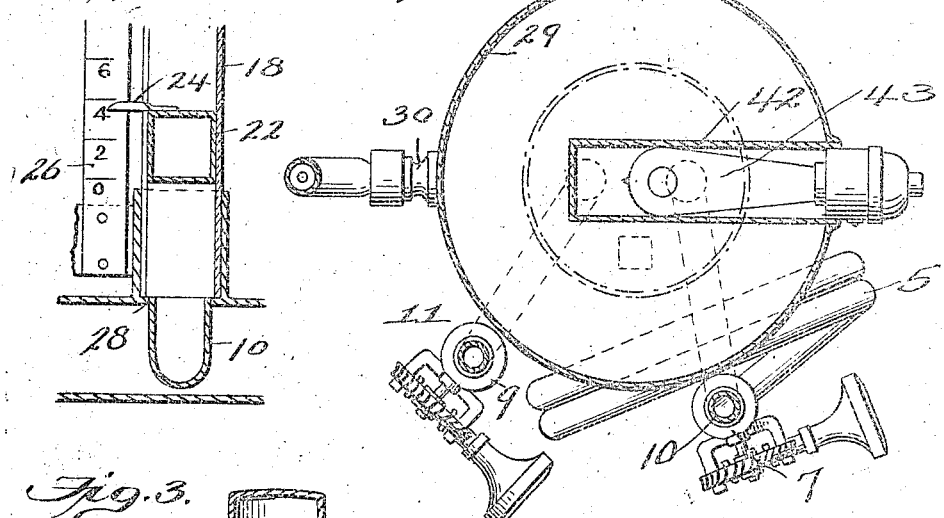
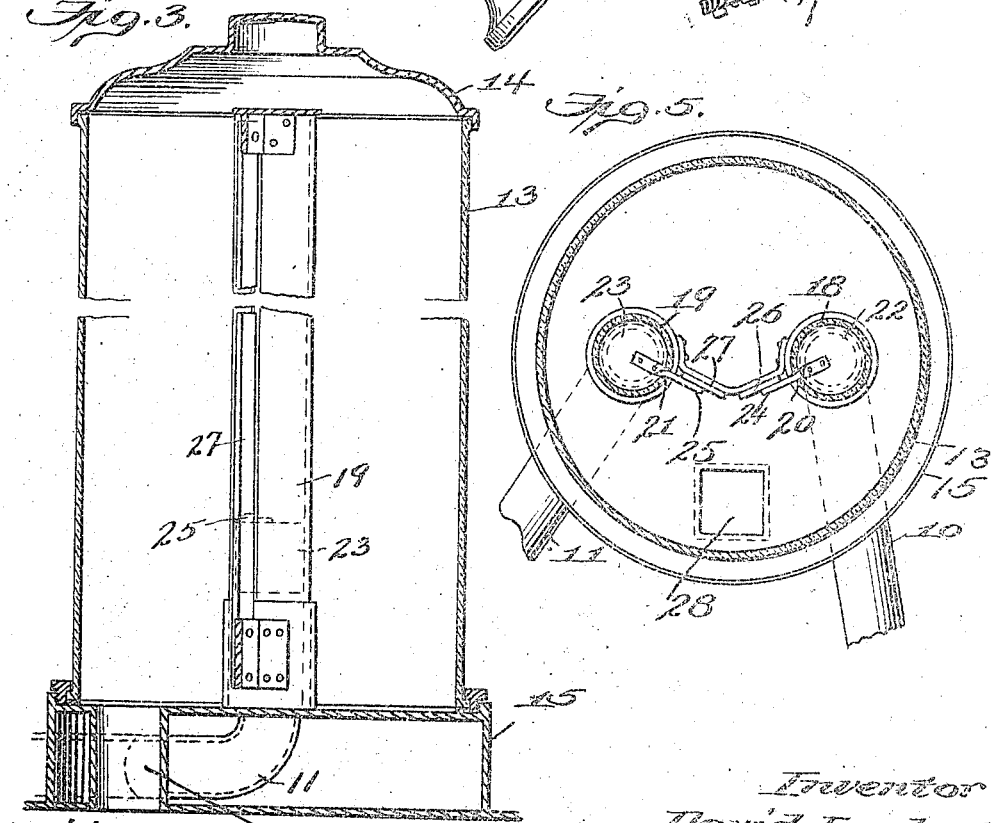
Witnesses
C. P. Kesler
C. A. Bateman
Inventor
David Lambert
by
Attorney

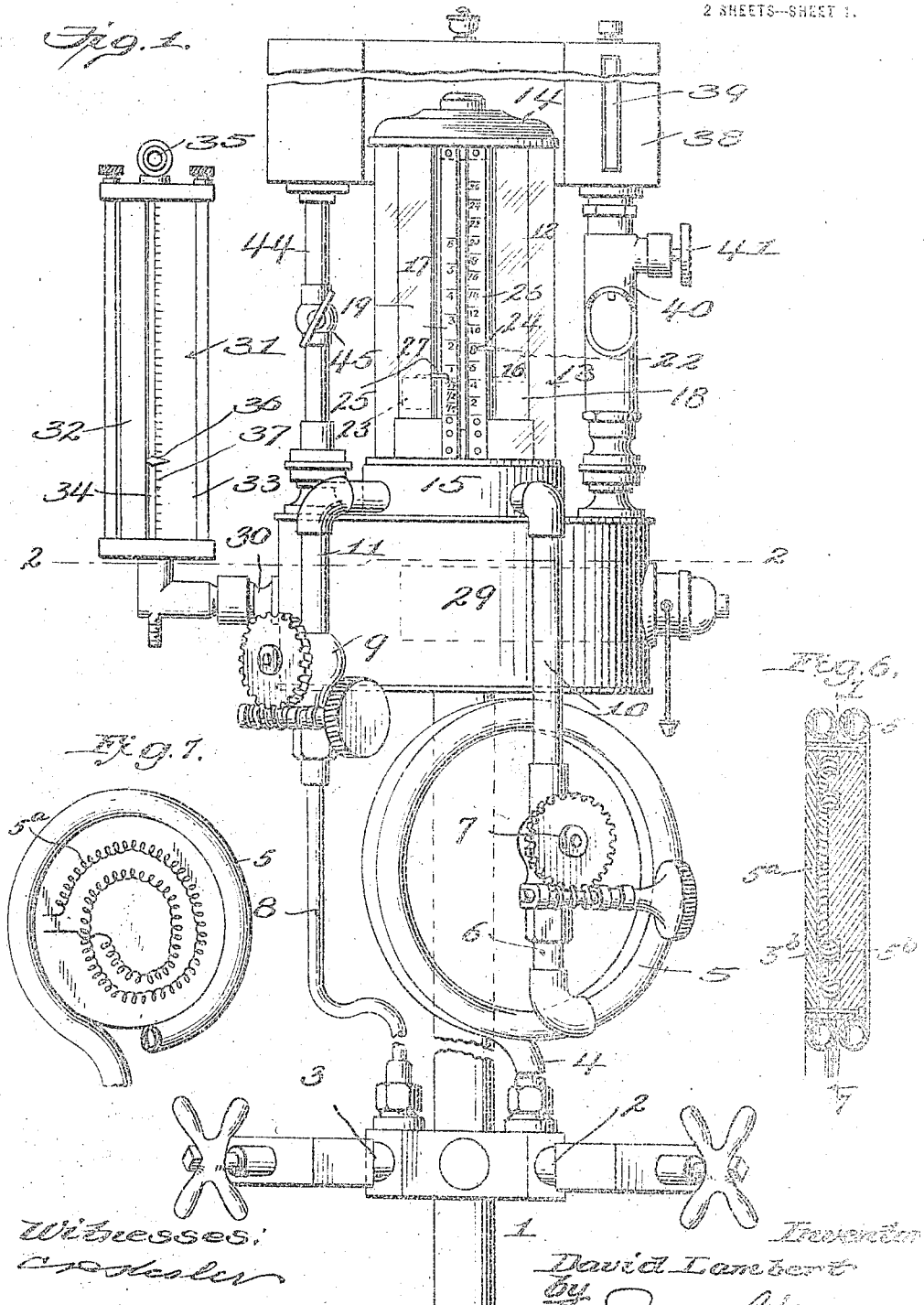

UNITED STATES PATENT OFFICE.

DAVID LAMBERT, OF NEW YORK, N. Y.

APPARATUS FOR ADMINISTERING ANESTHETICS.

1,222,421.

Specification of Letters Patent.   Patented Apr. 10, 1917.

Application filed June 10, 1915.  Serial No. 33,327.

*To all whom it may concern:*

Be it known that I, DAVID LAMBERT, a citizen of the United States, residing at New York, in the county of New York and State of New York, have invented new and useful Improvements in Apparatus for Administering Anesthetics, of which the following is a specification.

My present invention relates to improvements in apparatus for use in administering anesthetics, and the primary objects of the invention are to provide a compact, portable, and easily handled apparatus capable of being used for administering anesthetics of all kinds in different ways and for various purposes as, for example, intratracheal, pharyngeal, analgesia and dental anesthesia; to provide such apparatus with means whereby a correct measurement of the rate of flow of the gases, from minimum to maximum, will be clearly and directly indicated at all times, thus enabling the attendant to administer practically and with precision the scientific dosage of anesthetics; to provide such apparatus which will be capable of use in administering either nitrous oxid and oxygen, or ether, properly vaporized, and which enables the use of nitrous oxid and oxygen stored at high pressures without requiring special reducing valves.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a front elevation of an anesthetometer constructed in accordance with the present invention;

Fig. 2 represents a horizontal section on the line 2—2 of Fig. 1;

Fig. 3 represents a vertical section taken centrally through the measuring and indicating part of the apparatus;

Fig. 4 is a detail sectional view showing the lower portion of one of the measuring and indicating units;

Fig. 5 represents a horizontal transverse section through the measuring and indicating part of the apparatus.

Fig. 6 represents a transverse section through the electric heater and the nitrous oxid heating coil surrounding it; and Fig. 7 represents a section on the line 7—7 of Fig. 6.

Similar parts are designated by the same reference characters in the several views.

The present invention provides improvements which are applicable either in part or in whole to apparatus generally for administering anesthetics and for similar purposes. The several improvements are in the present instance shown in combination to provide an apparatus which makes it possible to administer, in a practical way, scientific dosages of anesthetics. It is to be understood, however, that the invention is not confined to the particular embodiment shown, as equivalent constructions are contemplated and will be included within the scope of the claims.

In the construction shown, the apparatus is preferably mounted on a suitable standard 1 which may be provided at its lower end with a base, and the standard or column 1 supports a suitable number of fittings to which the tanks, (stored with the suitable anesthetic and the oxygen, respectively, under high pressure, are connected. For example, the fitting 2 may receive a tank charged with nitrous oxid under pressure, and the fitting 3 may receive a tank charged with oxygen under pressure. Means is provided for heating the nitrous oxid gas to avoid refrigeration or undue cooling thereof consequent upon its expansion or reduction in pressure as it passes from its storage tank into the mixing chamber of the apparatus. As shown, this nitrous oxid passes through the pipe 4 into a heater, which is preferably of the type embodying a pipe coil 5 through which the nitrous oxid passes, and an electrical heating coil or wire 5ª arranged between a pair of disks 5ᵇ and contained within the pipe coil, whereby the nitrous oxid is heated electrically, the outlet 6 of the heater conducting the nitrous oxid gas to a regulating or controlling valve 7 which is preferably of the micrometer screw type, as shown, in order that it may be adjusted with sufficient accuracy to reduce the pressure of the nitrous oxid to the desired point and to maintain it at such reduced pressure. The oxygen from the storage tank connected to the fitting 3 is conducted by a pipe 8 to a second regulating or controlling valve 9 which valve is also preferably of the micrometer screw type, as shown, in order to enable the oxygen stored at high pressure to be delivered at the desired low pressure to the apparatus and to be maintained at such low pressure.

The present invention provides means whereby the rate of flow of the nitrous oxid and the oxygen at any given moment may be determined quickly and accurately. As shown, the nitrous oxid and oxygen at reduced pressures are conducted by the pipes 10 and 11 to a measuring and indicating instrument 12 which serves to measure the rates of flow of these fluids and to indicate such rates of flow. Preferably, the indicator comprises a glass or other transparent case 13 which has a top 14 fitted tightly on the upper end thereof, and the lower end of the glass case has a fluid-tight fit with a base 15. The glass case contains a pair of measuring and indicating instruments, one of these instruments, the instrument 16, serving to measure and indicate the rate of flow of the nitrous oxid, and the other instrument 17 serving to measure and indicate the rate of flow of the oxygen. These instruments in the present instance are duplicates, consisting of a pair of tubes 18 and 19 which are connected at their lower ends to the nitrous oxid and oxygen supply pipes 10 and 11, respectively. The tube 18 is formed in one wall with a longitudinally extending slot 20, and the tube 19 is formed with a similar slot 21, and a pair of indicator members 22 and 23 are contained in the tubes, pointers 24 and 25 being attached to the respective indicator members and coöperating with appropriately graduated scales 26 and 27, respectively. The indicator members 22 and 23 fit closely within the respective tubes but are free to reciprocate therein under the pressure exerted beneath them by the nitrous oxid and oxygen, respectively, these indicator members acting somewhat as floats or pistons. These indicator members 22 and 23 have a tendency, by reason of their weight, to assume positions at the bottoms of their respective tubes, but they will be lifted by the pressure of either the nitrous oxid or the oxygen entering the bottoms of the respective tubes, the nitrous oxid or oxygen escaping from the respective tubes through those portions of the slots 20 and 21 which are uncovered by and are beneath the indicator members 22 and 23, the rising or falling of either of these indicator members obviously providing an outlet of increased or diminished capacity through which the nitrous oxid or the oxygen, as the case may be, escapes from the respective tube and into the chamber inclosed by the casing 13. These indicator members are therefore capable of providing passages for the nitrous oxid and oxygen, respectively, which vary in accordance with variations in the rates of flow of these fluids, the rate of flow of either fluid determining the height or vertical position that the respective indicator member will occupy in its tube. The pointers connected to these indicator members indicate directly the rates of flow of the respective fluids according to the different positions occupied by the respective indicator members which are subjected to the influence of the flowing fluids and are positioned automatically in accordance with the rates of flow of such fluids.

The nitrous oxid and the oxygen, as stated, discharge into the chamber inclosed by the casing 13 through those portions of the slots 20 and 21 of the tubes which are beneath and are uncovered by the indicator members 22 and 23. From this chamber, these fluids pass through a conduit 28 into a mixing chamber 29 where they are commingled to form an anesthetic medium, the constituents of which are in the desired proportion, and the anesthetic medium is then in condition to be administered to the patient. As shown, the anesthetic medium will discharge from the mixing chamber 29 through an outlet 30, and it is preferable to fit into this outlet an instrument 31 to indicate the rate of flow of the anesthetic as the same passes on its way to the patient. Preferably, this instrument 31 is similar in its construction and mode of operation to one of the instruments for measuring either the rate of flow of the nitrous oxid or the oxygen, it being shown as comprising a tube 32, the lower end of which is connected to the outlet 30, and the tube is inclosed in a glass or transparent casing 33, the fluid which discharges from the tube through the slot 34 therein passing from the chamber inclosed by the casing 33 to an outlet 35, the latter being connected by a tube to a mask or other appliance suitable for use in administering the anesthetic to the patient in the mode desired. The tube 32 contains an indicator member similar to the float or piston described in connection with the instruments for measuring the rate of flow of the nitrous oxid and oxygen, the pointer 36 connected to the indicator member coöperating with an appropriately calibrated or graduated scale 37. The scales for the different measuring instruments are preferably calibrated to indicate the rates of flow of the different fluids in liters per minute. Where ether alone is used, the measuring instrument on the discharge or outlet of the apparatus shows the rate of flow of this ether vapor. Where a mixture of nitrous oxid and oxygen is applied, the measuring instrument on the outlet of the apparatus indicates the rate of flow of such mixture. Where oxygen alone is supplied, the measuring instrument on the outlet of the apparatus shows the rate of flow thereof.

In some instances, it is desirable or necessary to administer ether vapor as an anesthetic. The apparatus is shown provided with means whereby this may be accomplished. As shown, an ether supply tank 38 is mounted at the upper portion of the apparatus, it having a gage glass 39 to show the amount of ether contained therein in liquid form, and the tank has an outlet which is connected to a sight feed 40 through which the liquid ether drops into the mixing chamber 29. A regulating valve 41 is provided to adjust the rate of feed of the liquid ether from the supply tank. Vaporization of the liquid ether requires heat, and this heat is supplied by a heater which, in the present instance, is contained within the mixing chamber 29, it comprising a hollow casing or shell 42, the inner end of which is closed and the outer end of which is open to receive a heating device, preferably an incandescent electric lamp 43. This hollow casing or shell 42 is positioned immediately below the sight feed 40, the liquid ether dropping thereon, and as the hollow casing or shell is heated, the vaporization of the ether will be greatly facilitated. The vaporized ether passes from the mixing chamber 29 through the outlet 30, thence through the measuring instrument to the tube leading to the patient. In order to prevent interruption or variation in the flow of ether from the supply tank, a pipe or conduit 44 leads to this supply tank, for example, from the mixing chamber 29, and is provided with a valve 45 which may be closed when ether is not being administered. During the administration of ether, however, this valve 45 is open and air or vapor may enter the ether supply tank from the mixing chamber to replace the liquid ether discharged therefrom.

The present invention provides an apparatus for administering anesthetics which is compact, portable, and easily handled, and which is capable of being used with facility for administering anesthetics in scientifically measured doses, the exact amount of anesthetic, whether nitrous oxid and oxygen, or ether, flowing to the patient being indicated directly and clearly at all times as well as the proportions of oxygen and nitrous oxid, thereby providing the attendant with certain and reliable means of determining the dose of anesthetic which is being administered without depending upon the symptoms of the patient under the influence of the anesthetic. Furthermore, the apparatus enables the use of nitrous oxid and oxygen with highly charged tanks or without the necessity of using special reducing valves, although the micrometer valves provided enable the pressures of these fluids to be reduced to the proper working pressures and to be easily maintained at such pressures. Furthermore, these regulating or controlling valves as used in conjunction with the instruments for measuring the rates of flow of the constituents of the mixture enable a mixture to be used containing constituents of any desired proportion. Furthermore, should it become necessary, during the administration of a mixture of nitrous oxid and oxygen, to revive the patient, such, for example, as may occur should the patient give indications or symptoms of collapse under the effect of the anesthetic, the supply of nitrous oxid can be immediately cut off by closing the valve 7 and then oxygen alone fed to the patient, the administration of the anesthetic being afterward continued when the patient is in condition to receive it. The proper temperature of the nitrous oxid and oxygen mixture, and the ether is secured by the use of the respective heaters which prevent undue refrigeration or cooling thereof, due to expansion or vaporization, the present invention being especially adapted to the use of electric heaters which are capable of easy regulation to suit conditions.

I claim as my invention:—

1. Apparatus for administering anesthetics comprising a mixing chamber adapted to deliver the anesthetic to the patient, means for supplying the constituents of the anesthetic to said chamber, means for individually regulating the rates of flow of such constituents to said chamber, means for indicating directly the rates of flow of such constituents, and means for indicating directly the rate of flow of the anesthetic from said chamber to the patient.

2. Apparatus for administering anesthetics comprising a mixing chamber, means for supplying the constituents of the anesthetic thereto, a heating device operative upon one of the constituents of the anesthetic as the latter flows to said mixing chamber, the source of supply of said latter constituent being free from the influence of said heating device, and pressure reducing means at the outlet of the heating device.

3. Apparatus for administering anesthetics comprising a mixing chamber, means to contain a source of supply of an anesthetic, a heating device active on the anesthetic as the latter flows from its source of supply to said mixing chamber, and a pressure controlling and supply regulating valve located between the outlet of said heating device and said mixing chamber.

4. Apparatus for administering anesthetics comprising a chamber adapted to deliver an anesthetic to the patient, means for supplying either of two different kinds of anesthetics to said chamber, means for individually regulating the supply of either of said anesthetics, means for indicating the rate of flow of each of said anesthetics to said chamber, and means for indicating directly the rate of flow of anesthetic from said chamber.

5. Apparatus for administering anesthetics comprising a chamber adapted to deliver an anesthetic to the patient, means for supplying either of two different kinds of anesthetics to said chamber, means for individually regulating the rates of flow of said anesthetics to said chamber, means for indicating the rate of flow of each of said anesthetics, and means at the outlet of said chamber operative by the flow of fluid for measuring and indicating the rate of flow of the anesthetics which are being supplied.

6. Apparatus for administering anesthetics comprising a chamber, means for supplying constituents of an anesthetic to said chamber to mix therein, and instruments contained within said chamber for measuring and indicating the rates of flow of the respective constituents.

7. Apparatus for administering anesthetics comprising a chamber, and instruments therein for receiving and measuring and indicating the rates of flow of the constituents of an anesthetic and discharging such constituents into said chamber to mix therein.

In testimony whereof I have hereunto set my hand in presence of two subscribing witnesses.

DAVID LAMBERT.

Witnesses:
CARL KATCHER,
LOUIS BURO.